United States Patent [19]

Colarelli, III et al.

[11] Patent Number: 5,598,357
[45] Date of Patent: Jan. 28, 1997

[54] SHIM ADJUSTMENT SYSTEM AND METHOD FOR WHEEL ALIGNMENT APPARATUS

[75] Inventors: Nicholas J. Colarelli, III, Creve Coeur; Daniel B. January, St. Peters, both of Mo.

[73] Assignee: Hunter Engineering Company, Bridgeton, Mo.

[21] Appl. No.: 278,893

[22] Filed: Jul. 22, 1994

[51] Int. Cl.$^6$ ........................................ B62D 17/00
[52] U.S. Cl. .................... 364/559; 364/424.34; 280/661
[58] Field of Search ............... 364/559, 424.01, 364/424.03, 424.04, 424.05; 33/288; 280/661, 64

[56] References Cited

U.S. PATENT DOCUMENTS

| | | | |
|---|---|---|---|
| 4,381,548 | 4/1983 | Grossman et al. | 364/424.05 |
| 4,684,150 | 8/1987 | Specktor et al. | 280/661 |
| 4,872,699 | 10/1989 | Grove et al. | 280/661 |
| 4,973,075 | 11/1990 | Rori et al. | 280/661 |
| 5,007,658 | 4/1991 | Blechschmidt et al. | 280/661 |
| 5,044,659 | 9/1991 | Specktor et al. | 280/661 |
| 5,046,753 | 9/1991 | Giovanni | 280/699 |
| 5,074,578 | 12/1991 | Grove et al. | 280/661 |
| 5,080,388 | 1/1992 | Berry et al. | 280/661 |
| 5,098,117 | 3/1992 | Specktor et al. | 280/661 |
| 5,110,151 | 5/1992 | Blechschmidt et al. | 280/661 |
| 5,129,669 | 7/1992 | Specktor et al. | 280/661 |
| 5,327,655 | 7/1994 | Buchesky et al. | 33/288 |
| 5,383,678 | 1/1995 | Sokol | 280/661 |
| 5,388,057 | 2/1995 | January | 364/424.01 X |

*Primary Examiner*—Ellis B. Ramirez
*Assistant Examiner*—M. Kemper
*Attorney, Agent, or Firm*—Polster, Lieder, Woodruff & Lucchesi

[57] ABSTRACT

The system includes camber and toe sensing apparatus, a memory for storing camber and toe specifications for a plurality of vehicles, and a computer. The computer compares sensed camber and toe with corresponding specification of camber and toe, selects a shim from a plurality of standard shims and a shim orientation to attempt to correct both camber and toe in accordance with a preset priority, and determines residual camber error and residual toe error that would result from installation of the shim at the selected orientation. The user may select another orientation that attempts to correct both camber and toe in accordance with the manually requested desired priority. The user works with the system interactively, and can request various error priorities or allocation on the fly. The residual errors resulting from the selected priorities are displayed in substantially real time to provide visual feedback. The display includes a graphical representation of the shim to be inserted, shown in the installation orientation. The size of the representation of the shim may be made the same as the actual size of the shim. The user then places the actual shim up to the display and marks it appropriately for installation. This is especially useful for two piece shims which have parts movable with respect to each other to set shim taper. The actual size representation on the display facilitates orienting both parts of two part shims properly.

28 Claims, 11 Drawing Sheets

SHIM ADJUSTMENT SYSTEM AND METHOD FOR WHEEL ALIGNMENT APPARATUS

BACKGROUND OF THE INVENTION

This invention relates to vehicle wheel alignment and more particularly to vehicle wheel alignment systems for use with vehicles which utilize shims to simultaneously adjust the camber and toe of a vehicle wheel.

For example, tapered full contact rear shims are used to adjust the camber and toe of the rear wheels of certain vehicles. These shims are mounted between the spindle backing plate and the end of the rear axle assembly. The taper of these shims changes the angle between the spindle and the axle, thereby adjusting both toe and camber. A separate shim is required for each wheel.

Various shims and shim systems are known for simultaneously adjusting both camber and toe of a vehicle wheel. Among them are those shown the following U.S. Patents U.S. Pat. No. 5,129,669 to Specktor; U.S. Pat. No. 5,110,151 to Blechschmidt et. al.; U.S. Pat. No. 5,098,117 to Specktor et al.; U.S. Pat. No. 5,080,388 to Berry et al.; U.S. Pat. No. 5,074,578 to Grove et al.; U.S. Pat. No. 5,046,753 to Giovanni; U.S. Pat. No. 5,044,659 to Specktor et al.; U.S. Pat. No. 5,007,658 to Blechschmidt et al.; U.S. Pat. No. 4,973,075 to Rori et al.; U.S. Pat. No. 4,872,699 to Grove et al.; U.S. Pat. 4,684,150 to Specktor et al. These shims and shim systems in most cases accurately correct both toe and camber, but they could be improved.

It has been found that there are circumstances in which both camber and toe cannot be simultaneously corrected by some shims. By way of illustration, many shims come in fixed sizes, with fixed increments ($1/4°$ or $1/8°$ typically) between sizes. With a fixed taper, it is often not possible to correct both camber and toe perfectly. No matter how installed, there will be some residual error in toe, or camber, or both, with these shims. Some priority must be assigned, therefore, to toe and camber error to determine what shim and orientation to use. Alignment equipment is available which has a preset priority or allocation of toe and camber error. Such a priority might be, for example, one which weights the errors in a preset fashion (for example, weighting toe error as three times more significant than camber error) and minimizes the total error (the sum of the weighted toe residual error and the weighted camber residual error).

In such equipment, it would be desirable for the residual error of both toe and camber to be displayed to the technician/user, so the user could be aware of the existence, direction and magnitudes of the errors. On occasion the user may prefer a different allocation of residual error between toe and camber. For example, the user may prefer an adjustment which results in zero residual error in toe, while letting the camber residual error increase, or vice versa. Presently available equipment is not believed to provide the technician with this capability. Moreover, if such a feature were available, it would be highly desirable to display to the technician the resulting residual error in camber (or toe) if the preset allocation of residual errors is changed. Moreover, the display of such residual errors should occur in substantially real time, to give the technician useful, timely information concerning the effect of his or her proposed action.

There may be certain orientations for shim installation which are more convenient for the technician than others. A bolt may interfere with installation in the orientation determined by the system, for example, in the case of certain shims. The technician faced with this situation may have a choice concerning how best to approximate the desired orientation, but at present it is not believed that the technician is provided with any information concerning the effect of installing the shim at a slightly different orientation. It would be very desirable to have a display of residual errors which would result from installation at any orientation desired by the technician. Moreover, certain vehicles include provisions (such as an adjustable cam) for adjusting toe independently of any adjustment caused by installation of a shim. For those vehicles, a technician may desire to correct camber with the shim, while leaving most of the correction of toe to the other procedure.

On occasion, the technician may not have available the exact size shim required. It would be advantageous to the user to select another size shim which is in stock, so long as the residual errors resulting from the substitute shim could be easily and readily displayed to determine the acceptability of the proposed substitution. Currently, large charts are available which indicate which size shims to use for particular situations, but these charts are of limited utility in connection with determining appropriate substitute shims.

Even when the technician has the proper size shim in stock, it is not always easy to determine the proper orientation of the shim for installation. It would be highly desirable to have a "life sized" representation of the proper shim in the proper orientation to assist the technician in installing the shim properly. Such representations (whether on a computer screen or on paper) are not generally provided by current systems.

There are adjustable shims which overcome some of the difficulties discussed above. These are two-piece shims which can be rotated, one relative to the other, such that the shim has the correct taper for accurate adjustment of both camber and toe. The entire shim is then rotated to the correct orientation angle and installed. Such shims have adjustable taper. That is, they are not limited to the discrete values of taper found in one-piece shims. They, therefore, normally provide "perfect" adjustments, provided that the changes required are not so large that the shim cannot provide enough change.

It has been found, however, that rotating the two pieces of the adjustable shims to exactly the correct position in not a trivial undertaking. The determination of the proper position of the two pieces may be made by the system, but it is the technician that must make the actual change. In performing this operation it is very important that an actual size representation of the two-piece shim be made available to the user to assist in the proper orientation of the two pieces. A display on a screen or on paper which is of a different size than the actual shim itself is of only limited assistance in making this adjustment.

SUMMARY OF THE INVENTION

Among the various objects and features of the present invention may be noted the provision of a shim adjustment system for vehicle wheel alignment which facilitates the selection and installation of shims to correct camber and toe.

Another object is the provision of such a system which may be interactively used by a technician to accommodate the technician's requirements and preferences.

A third object is the provision of such a system which accurately determines the correct shim and shim orientation to best correct camber and toe.

A fourth object is the provision of such a system which provides an indication of the residual error in camber and toe which would result if the selected shim were installed.

A fifth object is the provision of such a system which expedites the use of adjustable shims in correcting camber and toe.

Other objects and features will be in part apparent and in part pointed out hereinafter.

Briefly, in a first aspect of the present invention, a shim adjustment system is provided for wheel alignment apparatus. The shim adjustment system includes camber and toe sensing apparatus for sensing the camber and toe of a wheel on a vehicle to be aligned, a memory for storing camber and toe specifications for a plurality of vehicles, and a computer. The computer compares the sensed camber and toe with the corresponding specifications of camber and toe for the wheel of the vehicle to be aligned, selects a shim from a plurality of standard shims and an orientation for the selected shim to attempt to correct both camber and toe in accordance with a preset priority, and determines residual camber error and residual toe error which would result from installation of the selected shim at the selected orientation. The system also includes at least one manually operable input device operable by a user for selecting a different desired priority of residual camber error and residual toe error, the computer being responsive to the manually operable input device for selecting another orientation which attempts to correct both camber and toe in accordance with that different desired priority.

In a second aspect of the present invention, the shim adjustment system includes camber and toe sensing apparatus for sensing the camber and toe of a wheel on a vehicle to be aligned, a memory for storing camber and toe specifications for a plurality of vehicles, and a computer. The computer compares the sensed camber and toe with the corresponding specifications of camber and toe for the wheel of the vehicle to be aligned, selects a shim from a plurality of standard shims and an orientation for the selected shim to attempt to correct both camber and toe, and determines residual camber error and residual toe error which would result from installation on the vehicle of the selected shim at the selected orientation. A display displays to a user a graphical representation of the selected shim and selected shim orientation. A manually operable input device operable by the user is provided for selecting a desired change in the orientation of the selected shim, the computer being responsive to the selection of a desired change in the shim orientation to cause the display to the user of the residual camber error and residual toe error resulting from the use of the displayed shim at the desired orientation.

In a third aspect of the present invention, the shim adjustment system includes camber and toe sensing apparatus for sensing the camber and toe of a wheel on a vehicle to be aligned, a memory for storing camber and toe specifications for a plurality of vehicles, and a computer. The computer compares the sensed camber and toe with the corresponding specifications of camber and toe for the wheel of the vehicle to be aligned, selects a shim from a plurality of standard shims and an orientation for the selected shim to attempt to correct both camber and toe, and determines residual camber error and residual toe error which would result from installation on the vehicle of the selected shim at the selected orientation. A display displays to a user the residual camber error and the residual toe error determined by the computer prior to installation of the selected shim at the selected orientation on the vehicle.

In a fourth aspect of the present invention, the shim adjustment system includes camber and toe sensing apparatus for sensing the camber and toe of a wheel on a vehicle to be aligned, a memory for storing camber and toe specifications for a plurality of vehicles, and a computer. The computer compares the sensed camber and toe with the corresponding specifications of camber and toe for the wheel of the vehicle to be aligned, and determines the required taper and orientation of a two-piece adjustable shim for correcting any difference between sensed camber and toe and the corresponding specifications. A display displays a representation of the required orientation of the two-piece shim and of the relative positions of the two pieces of the two piece shim to obtain the required taper. A manually operable input device is provided for interactively changing the size of the displayed representation of the two piece shim such that the displayed representation may be adjusted to the actual size of the two-piece shim if desired by the user.

In a fifth aspect of the present invention, a method of shim adjustment for wheel alignment apparatus includes the steps of sensing the camber and toe of a wheel on a vehicle to be aligned, comparing the sensed camber and toe with corresponding specifications of camber and toe for the wheel of the vehicle to be aligned, and selecting a shim from a plurality of standard shims and an orientation for the selected shim to attempt to correct both camber and toe in accordance with a preset priority. The residual camber error and residual toe error which would result from installation of the selected shim at the selected orientation is determined, the preset priority of residual camber and toe is manually changed, and another orientation for the selected shim which attempts to correct both camber and toe in accordance with the changed priority is selected.

In a sixth aspect of the present invention, a shim adjustment method includes the steps of sensing the camber and toe of a wheel on a vehicle to be aligned, comparing the sensed camber and toe with corresponding specifications of camber and toe for the wheel of the vehicle to be aligned, selecting a shim from a plurality of standard shims and an orientation for the selected shim to attempt to correct both camber and toe, and determining residual camber error and residual toe error which would result from installation on the vehicle of the selected shim at the selected orientation. A representation of the selected shim and selected shim orientation is displayed to the user, who can manually request a desired change in the orientation of the selected shim. In response to such a request, the residual camber error and residual toe error resulting from the use of the displayed shim at the desired orientation is displayed.

In a seventh aspect of the present invention, a shim adjustment method includes the steps of sensing the camber and toe of a wheel on a vehicle to be aligned, comparing the sensed camber and toe with the corresponding specifications of camber and toe for the wheel of the vehicle to be aligned, and selecting a shim from a plurality of standard shims and an orientation for the selected shim to attempt to correct both camber and toe. The residual camber error and residual toe error which would result from installation on the vehicle of the selected shim at the selected orientation is determined and displayed to a user.

In an eighth aspect of the present invention, a shim adjustment method includes the steps of sensing the camber and toe of a wheel on a vehicle to be aligned, comparing the sensed camber and toe with the corresponding specifications of camber and toe for the wheel of the vehicle to be aligned, and determining the required taper and orientation of a two-piece adjustable shim for correcting any difference between sensed camber and toe and the corresponding specifications. A representation of the required orientation of the two-piece shim and of the relative positions of the two pieces of the two piece shim to obtain the required taper is displayed and the size of the displayed representation of the two piece shim is interactively changed such that the displayed representation may be adjusted to the actual size of the two-piece shim if desired by the user.

BRIEF DESCRIPTION OF THE DRAWINGS

Similar reference characters indicate similar parts throughout the several views of the drawings.

DETAILED DESCRIPTION OF THE PREFERRED EMBODIMENT

Figure 1:
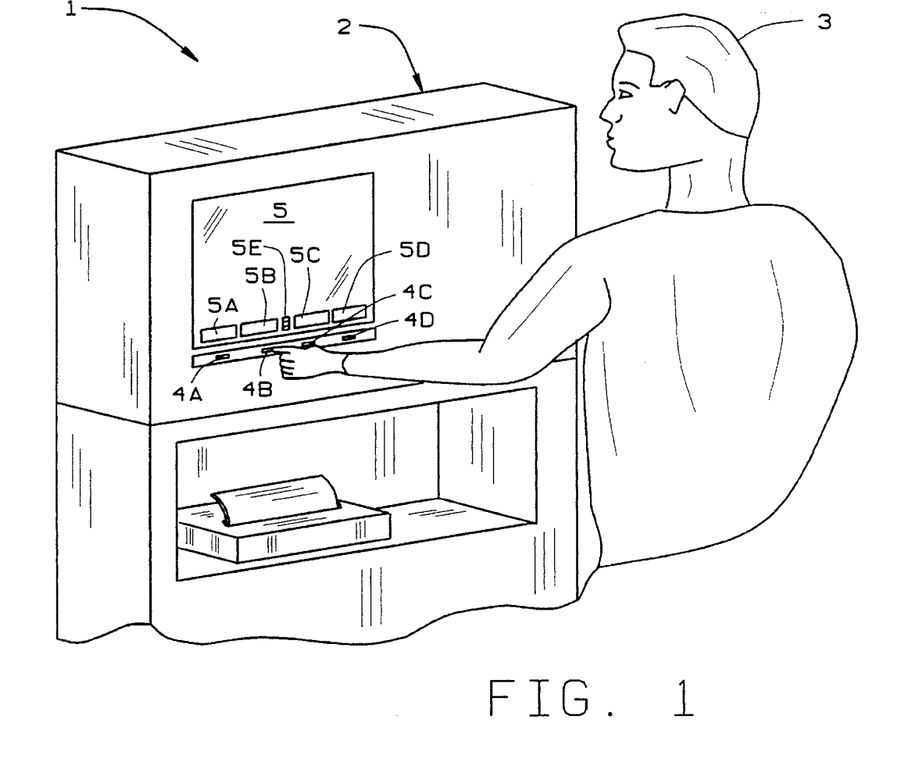
FIG. 1 is a perspective view of a vehicle alignment system console, with a technician/user, which includes the shim adjustment system of the present invention.

It is preferred that the present invention be embodied in a computer controlled vehicle wheel alignment system 1, such as those shown in U.S. Reissue Pat. Nos. 33,144 to Hunter et al. and U.S. Pat. No. 4,381,548 to Grossman and January, the disclosures of which are incorporated herein by reference. Alignment system 1 includes a console 2 suitably mounted on a stand for use by a technician/user 3. Console 2 includes a set of manually operable input keys or switches 4(A–D) and a display 5. Display 5 is preferably a CRT computer monitor type display.

Figure 2:
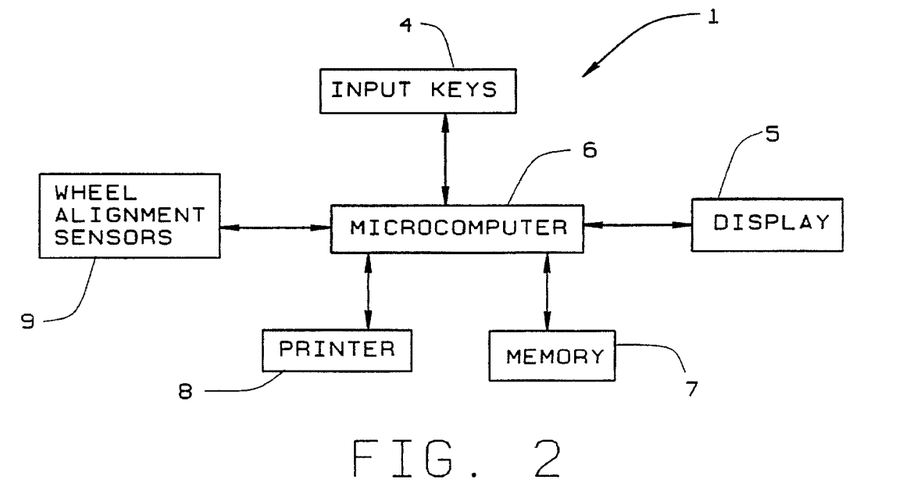
FIG. 2 is a block-diagram of the circuitry of the system of FIG. 1.

Input keys 4 and display 5 are connected to a microcomputer 6 (FIG. 2), which is also connected to a digital memory 7 and a printer 8. It should be understood that memory 7 could be internal to the microcomputer, depending upon the particular microcomputer used. Suitable alignment sensors 9 are also operatively connected to microcomputer 6 for supplying measured alignment information to the microcomputer. Such sensors are shown in the above-mentioned U.S. patents, and in U.S. Pat. No. 4,879,670 to Colarelli, the disclosure of which is also incorporated herein by reference.

System 1 works interactively with the technician/user. This is done by means of display 5, which includes four variable function blocks 5A–5D (the display of which is controlled by microcomputer 6). Function blocks 5A–5D are disposed directly over corresponding switches 4A–4D and display to the user the function of those switches at that particular time in the program which controls the operation of microcomputer 6. Alternatively, a pointing device such as a light pen or a mouse (not shown) may be used to select items on screen 5.

Figure 3A:
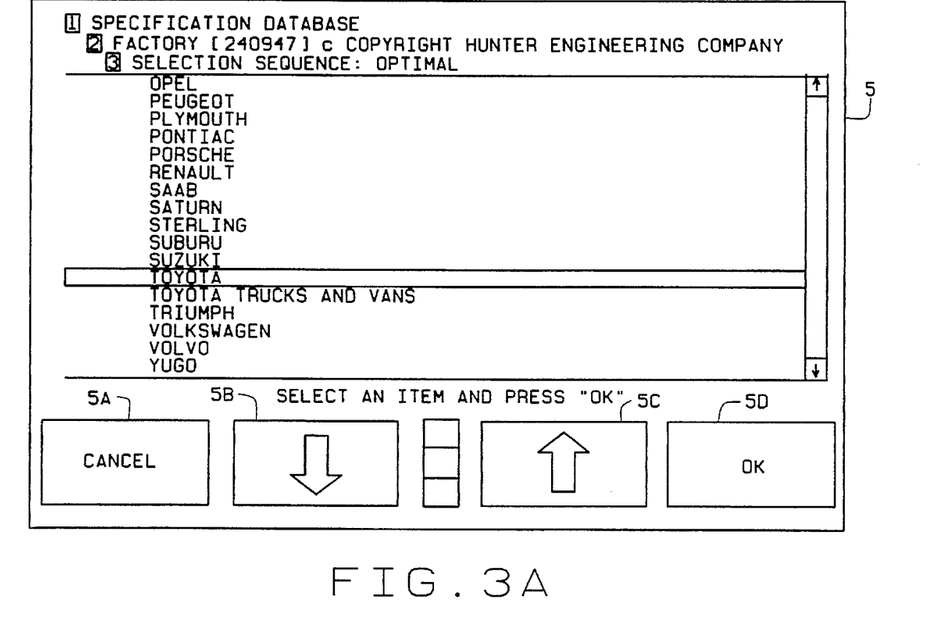
FIGS. 3A–3C are illustrative screens used in the present invention to select the make, model and year of the vehicle being aligned.
Figure 3B:
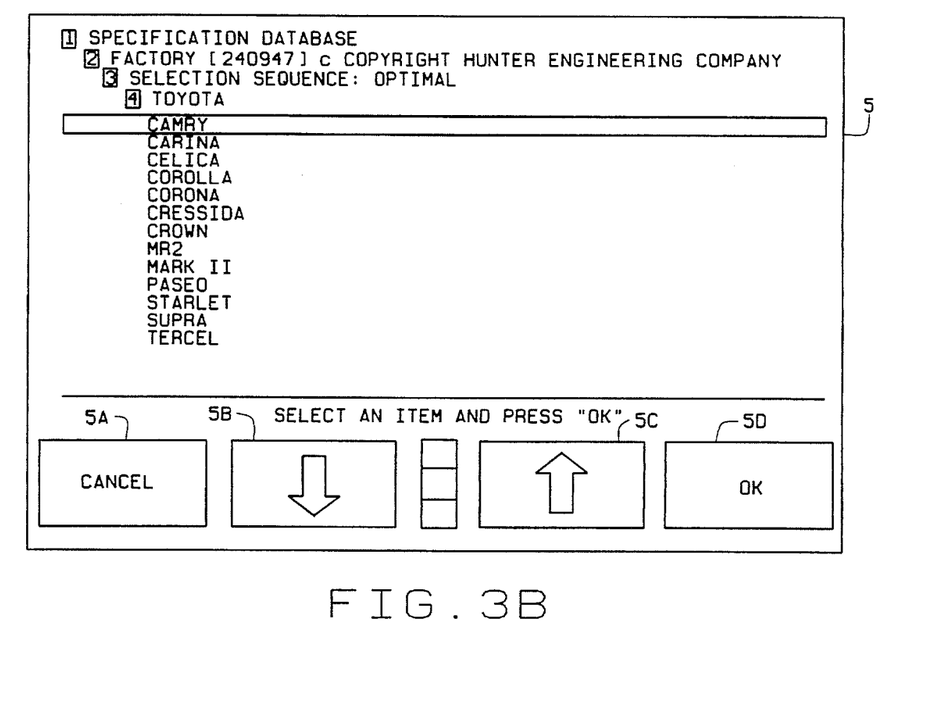
Figure 3C:
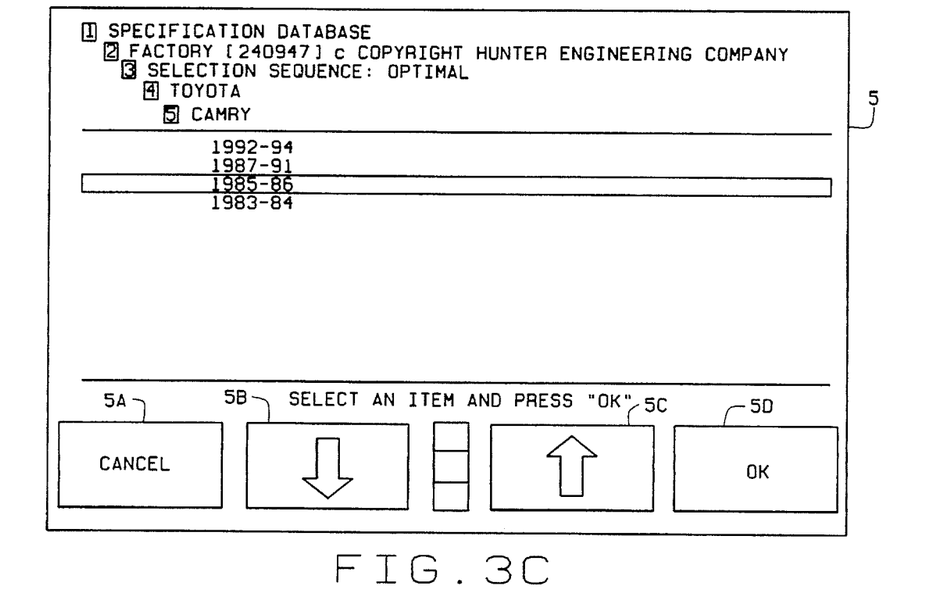

It is conventional for vehicle wheel alignment systems such as system 1 to have stored in memory 7 a database of vehicle specifications, including vehicle wheel alignment specifications, so that the alignment specifications of the vehicle under investigation are accessed for use upon identification to the system of the vehicle make, model, and year. The user identifies the vehicle make, model, and year interactively by use of keys 4 in combination with the display on screen 5 of lists of vehicles, arranged by make, model, and year. This is illustrated in FIGS. 3A–C, showing the initial selection of make from the menu of FIG. 3A, the selection of model from the menu of FIG. 3B, and the selection of year from the menu of FIG. 3C.

It should be appreciated that system 1 guides the technician through a full range of vehicle alignment procedures, not just shim installation. The present description is illustrated herein, however, by reference to those functions of system 1 relating to shim installation, and more specifically relating to the installation of rear shims on a vehicle, such as the vehicle selected using the menus of FIGS. 3A–3C.

It is well-known that the determination of required toe and camber changes involves measuring the relevant alignment angles and comparing the measured values with specifications for those angles. It is also well known that before such measurements are taken the alignment sensors must be compensated by any of a number of conventional compensation methods. The present description assumes that one of ordinary skill in the art is capable of acquiring sensor data of sufficient accuracy to obtain reliable toe and camber angles.

Figure 4:
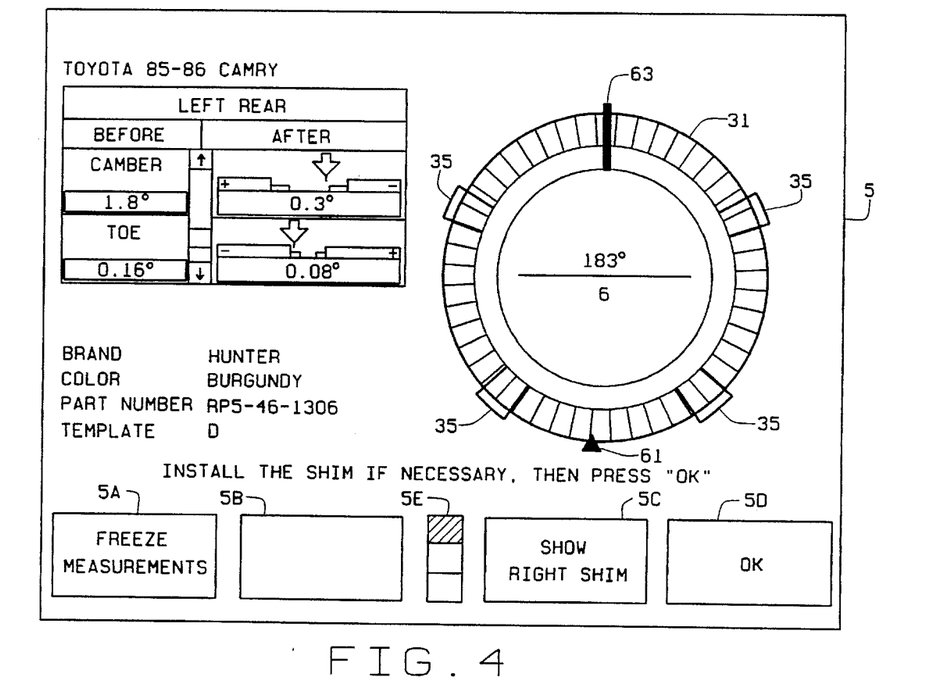
FIGS. 4–4B are illustrative screens used in the present invention to guide the technician in perfoming the installation of shims selected by the system to correct camber and toe.

Microcomputer 6 takes the sensor data from wheel alignment sensors 9, determines camber and toe from those measurements, and compares those values with specification values for camber and toe. The result for each wheel is a difference between specification and measurements for both camber and toe. The microcomputer displays these differences in a column labeled "Before" on screen 5 (see FIG. 4). FIG. 4 illustrates this information for the left rear wheel. The screen for the other wheel is similar. Microcomputer 6 takes this information, along with information concerning standard shims, also stored in its memory, and computes the shim and shim orientation to correct both toe and camber. For example, a preferred way of determining which shim to use and the required shim orientation is to calculate the residual toe error and residual camber error for all the shims in a set of standard shims and select the shim which, when properly oriented, results in zero error in both camber and toe.

In the event it is not possible to completely correct both toe and camber, the computer must weigh the residual errors in both to attain a satisfactory result. Since toe is a large factor in tire wear, residual errors in toe are usually more important than residual errors in camber. System 1 is thus set up to weigh errors in toe three times as heavily as errors in camber. Other appropriate weightings of the toe and camber error could be used instead. Microcomputer 6 selects the shim and shim orientation which minimizes total error as weighted by the preset priority (in this case 75% toe, 25% camber).

As can be seen in FIG. 4, the differences between measured values and specification are shown in numeric form for both camber and toe. Positive numbers such as those shown in FIG. 4 means that the camber (or toe as appropriate) must be made more positive, while negative numbers mean that the angle must be made more negative.

Also shown on screen 5 is the shim 31 required to make the necessary changes in toe or camber. In the center of the shim is the size and orientation angle required. This display on screen 5 also includes an "After" column in the upper left-hand corner of the screen which shows the residual errors which would result if the shim 31 shown on the screen were installed in the orientation shown. These errors are illustrated in bar graph form so that the quality of the proposed adjustment with respect to the alignment specifications can be gauged quickly.

As is explained below, the shim may be shown life-sized (the size of the actual shim it represents) and a life-sized representation of the shim is normally advantageous. When shims are displayed life-sized, the display of the shim on screen 5 acts as a template. The user merely holds the actual shim over the displayed shim, orients the shim as shown in the display, and marks the top of the shim. If necessary, any breakouts 35 needed to clear the mounting bolts are marked at the same time. Shims are typically color-coded and the display of the shim may also display the selected shim in its proper color to aid the technician in finding the appropriate shim. The shim is then installed exactly in the orientation shown in the display on screen 5.

Although FIG. 4 illustrates the display for the left rear wheel, the technician may obtain the corresponding display for the right rear wheel by pressing key 4C (corresponding to display 5C) or by using a pointing device to actuate that portion of the display. Display 5C then toggles to display "Show Left Shim" so that the user may easily switch back and forth as desired.

Figure 4A:
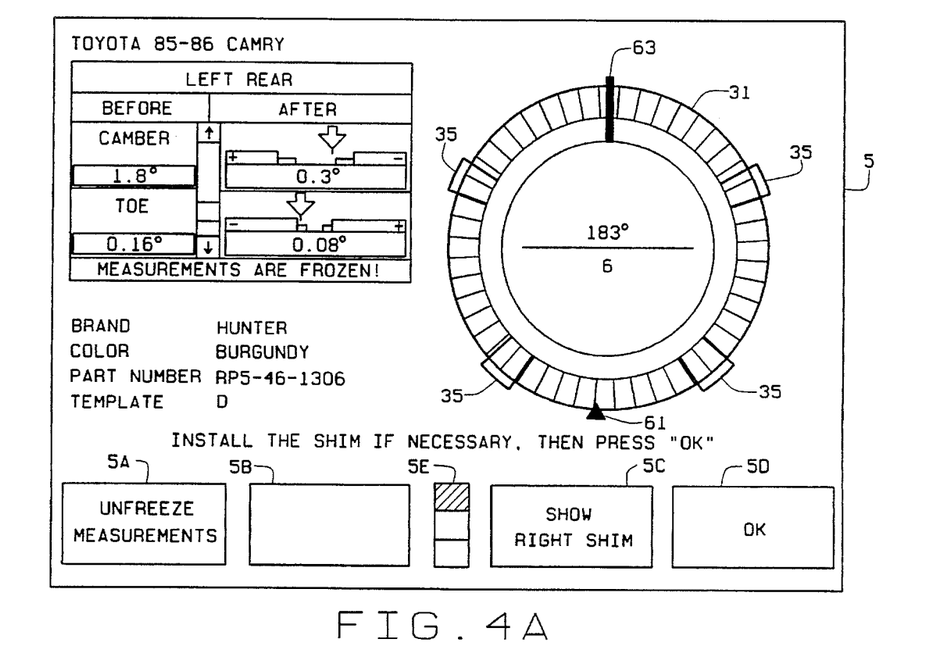

Actuating display 5A, labeled "Freeze Measurements" freezes the measurements shown in the "Before" column of screen 5. The legend "Measurements are Frozen!" then appears on the screen, as shown in FIG. 4A. In addition the legend on display 5A switches from "Freeze Measurements" to "Unfreeze Measurements" at the same time. Freezing the measurements allows the sensors to be removed from the wheels for shim installation while the display continues to show the shim requirements. The technician presses "Unfreeze Measurements" to return the display to normal "live" operation.

Figure 4B:
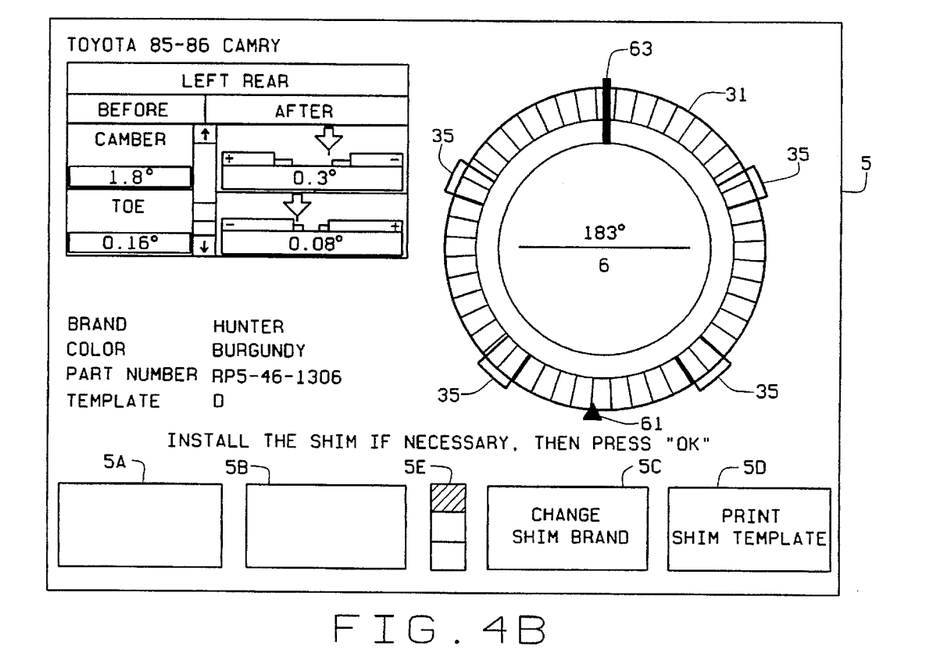

It should be noted that in FIG. 4 a display section 5E is shown which has three segments, the active one of which is cross-hatched. The number of segments may vary, but this portion of the display is used to select different preprogrammed legends for the soft keys 5A–5D. For example, in FIG. 4B the middle segment of display 5E is active and the legends displayed on soft keys 5C and 5D are "Change Shim Brand" and "Print Shim Template." Several shim brands are preferably supported by system 1, so a technician can use key 5C to select a specific brand from among all the brands supported by the system. Key 5D in this mode is actuated to have microcomputer 6 cause printer 8 to print a life-sized template of the selected shim. This can be used as an alternative to holding the shim over the display on screen 5 to mark the top and the breakouts.

As can be noted in FIG. 4, the particular shim selected (in this example a fixed taper shim) does not adjust either camber or toe perfectly. When the selected shim (in this case a Burgundy Hunter shim) is installed at the selected orientation (183°) the camber in this example will still be off by 0.3° and toe will be off by 0.03°. The selection of shim and orientation involves a compromise between toe and camber adjustments. In this case the system is set to minimize the total error in camber and toe (as weighted by the preset priority, discussed above). The bar graphs in the "After" column of the display show the quality of the proposed adjustments the indicated shim would provide by showing the residual errors for camber and toe which would result after installation.

Figure 5:
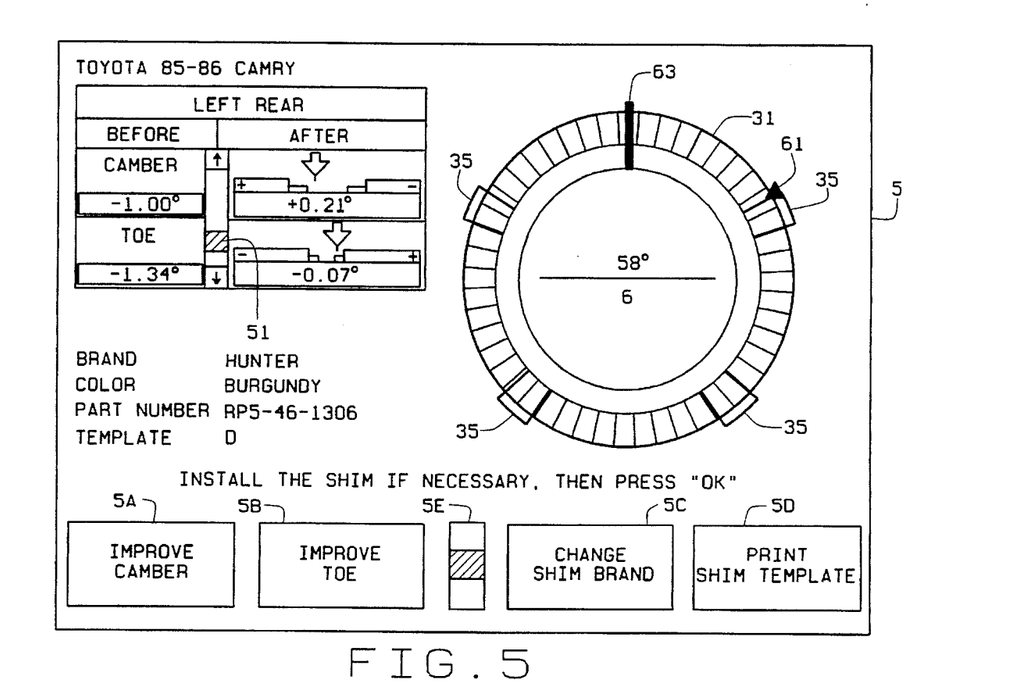
FIGS. 5–5F are illustrative screens used in the present invention to change, upon request of a user, the shim orientation and shim selection to correct camber and toe.
Figure 5A:
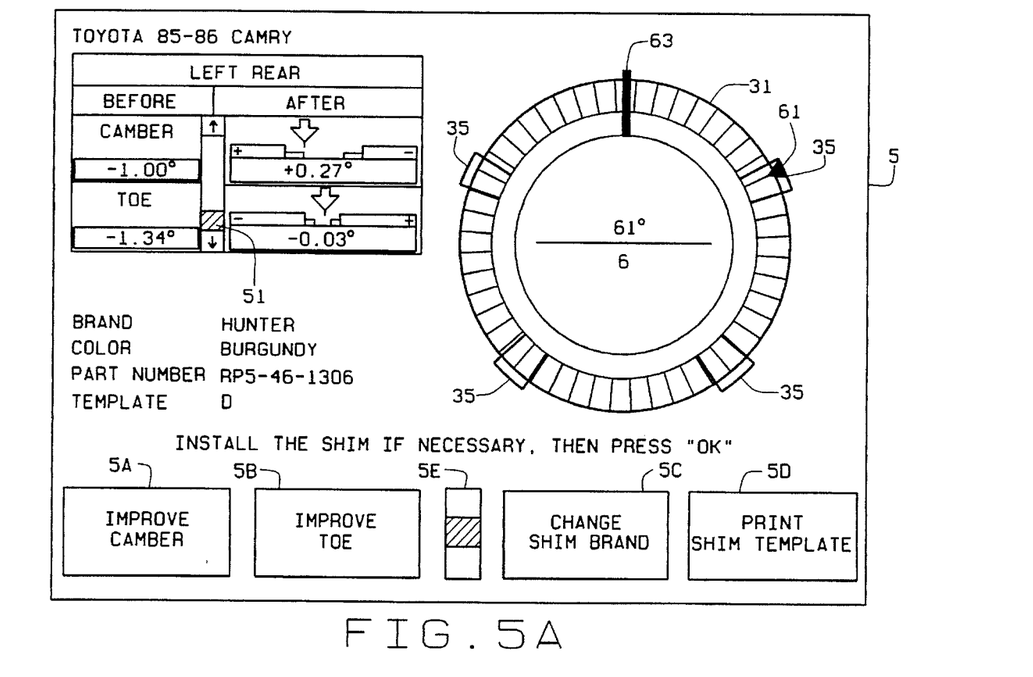

If the technician wishes to change the allocation of errors between toe and camber from the priority or weighting which is preset in the system, he may do so. For example, FIGS. 5–5E illustrate another measurement in which the camber of the left rear wheel of a 1985–86 Toyota Camry requires 1.00° of negative change and the toe requires 1.34° of negative change. Microcomputer 6 in response to the measurements selects the No. 6 shim illustrated and determines, based upon the preset priority between camber and toe error, that the shim should be oriented at 58° to correct both camber and toe. If installed at the correct orientation, the residual error in camber would be 0.21° and the residual error in toe would be −0.07°. These figures are displayed in connection with the corresponding bar graphs in the "After" column on screen 5.

The technician is not limited by the present system to installing the shim at the orientation determined by the computer. For example, if it is desired to improve toe, the technician may use soft key 5B to improve the toe results, at the expense of somewhat poorer camber error. Specifically, microcomputer 6 is responsive to actuation of soft key 5B to increase the weighting of toe error at the expense of camber error in the determination of total error. Actuation may result, for example, in toe error being weighted at 80% or even 90% while the camber error is weighted at 20% or even 10%. A scroll bar 51 between the "Before" and "After" columns displays to the technician the relative weights of toe and camber interactively during actuation of soft key 5B. A toe error weighting of 90% is illustrated in FIG. 5A by scroll bar 51 being at its lowest-most position between the "Before" and "After" columns. (The scroll bar shown in FIGS. 5–5D represents at its highest position a weighting of 90% camber/10% toe, and at its lowest position 10% camber/90% toe. Other ranges, including 0% to 100%, are possible and a matter of choice.) Similarly, actuation of soft key 5A results in microcomputer 6 increasing the weighting of camber error at the expense of toe error.

If the system is equipped with a pointing device (a mouse or a light pen), scroll bar 51 can be moved directly by the technician. Microcomputer 6 is responsive to movement of the scroll bar to weight the toe and camber errors in accordance with the selected scroll bar position. In any event as the technician manipulates the weighting of the camber and toe errors, the microcomputer continuously recalculates the orientation of the selected shim to correspond to the priority of camber and toe errors requested by the technician. This orientation is, in substantially real time, displayed to the user.

For example, the orientation of shim 31 which best satisfies the preset weighting of 75% toe/25% camber is 58°, as shown numerically in the interior of the shim display and by the position of a pointer 61 with respect to a reference position 63 in FIG. 5. When the priority is changed to 90% toe/10% camber as indicated in FIG. 5A, the microcomputer recomputes the proper orientation to be 61° as shown in that figure both numerically and by the changed position of the pointer 61. At the same time, the bar graphs show the residual camber and toe errors to the user. In FIG. 5A, the reallocation of error priority by the technician has resulted in a residual toe error of −0.03°, down from the previous value of −0.07° in FIG. 5, but an increase in residual camber error to 0.27° from 0.21°. It should be appreciated that the microcomputer continuously updates these displays so that as the scroll bar is moved the residual error values and indicator arrows on the bar graphs change correspondingly, thereby indicating to the user the effect, in substantially real time, of the particular allocation of errors represented by the current position of the scroll bar. Thus, the technician can use this system to determine interactively, and before installing any shims, what the residual errors would be in both camber and toe if he installs the shim at the orientation determined by his particular priority of camber and toe errors.

Figure 5B:
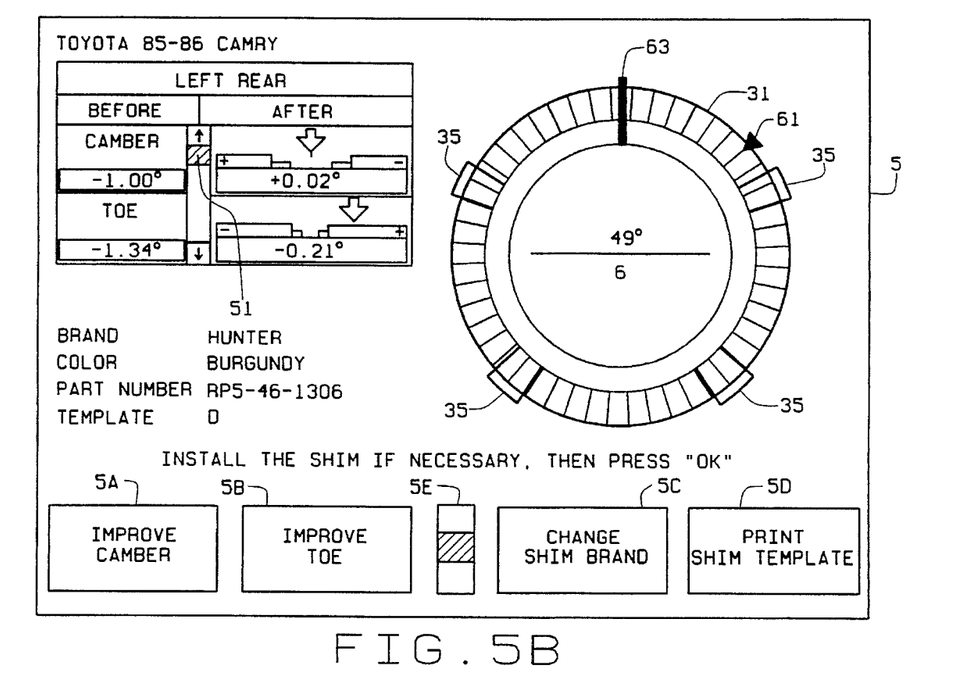

This feature is further illustrated by the display of FIG. 5B, in which the technician has moved scroll bar 51 to its uppermost position in which camber errors are weighted 90% and toe errors are weighted 10%. The microcomputer calculates and displays the required orientation to satisfy this criterion (namely 49°), and also displays the residual camber error of 0.02° and the residual toe error of −0.21° which would result from the installation of the selected shim at that orientation. Although that residual value of camber error is well within the tolerances represented by the stepped portions of the camber residual error bar graph, the corresponding residual toe error is outside of the tolerances, as indicated by the position of the indicator arrow on the top, flat portion of its bar graph. This would be acceptable, for example, only if some other method were available to correct toe after installation of the shim.

Note that although the present invention is described in connection with the left shim, the right shim is selected and oriented in the same way. Moreover, the adjustments for each shim are independent of the adjustments for the other shim.

Figure 5C:
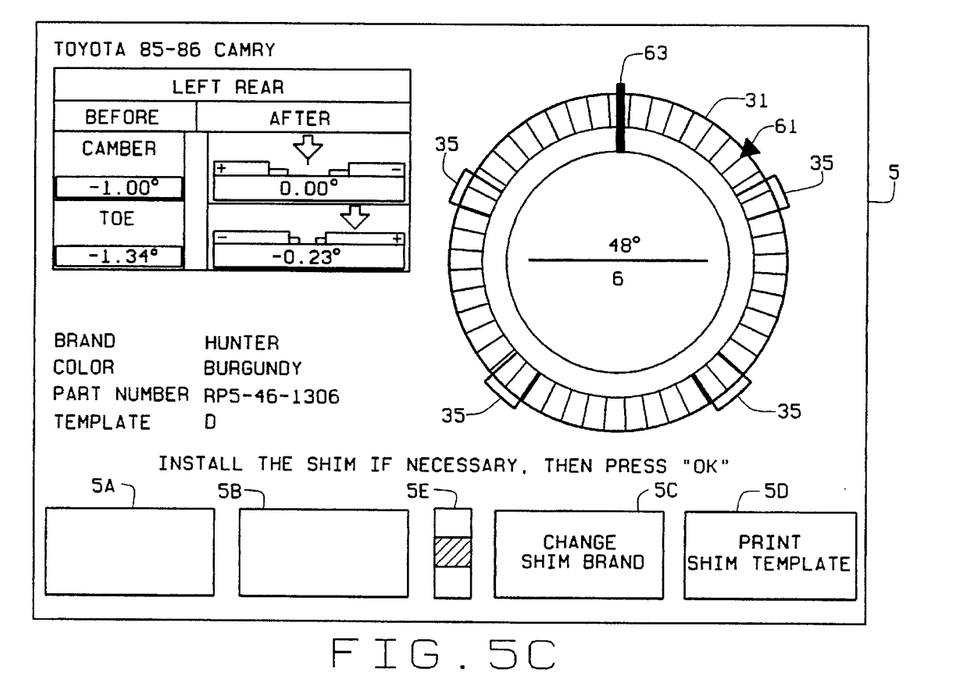
Figure 5D:
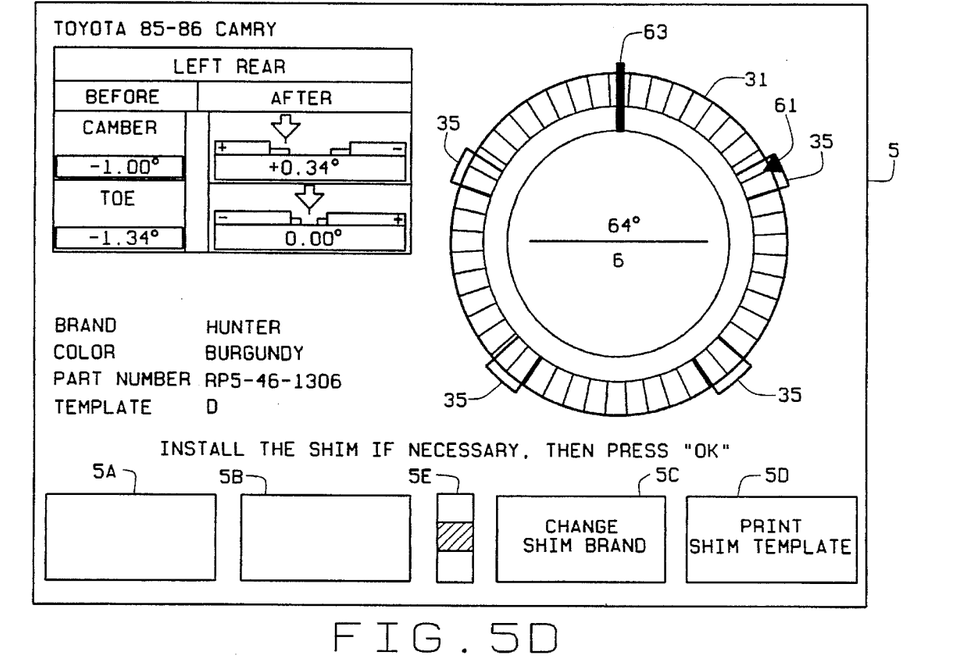
Figure 5E:
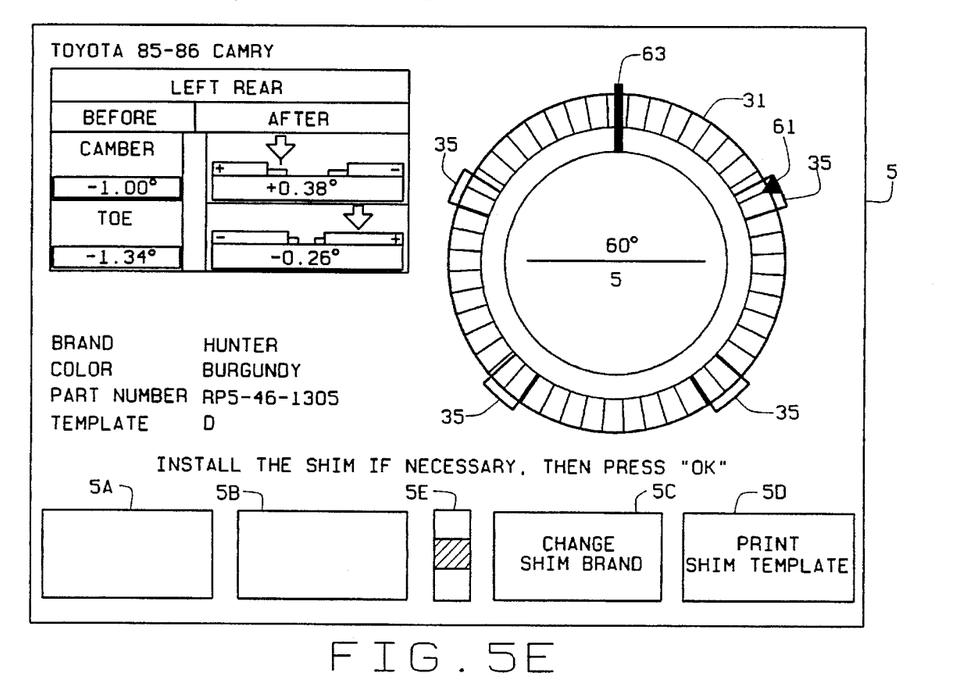

If the system includes a pointing device such as a light pen or a mouse, the technician may perform even further manipulations. This is done by using the pointing device to drag the shim to any desired orientation. Dragging the shim results in the displayed graphical representation of the shim being rotated about its axis a corresponding amount. As the shim is dragged (rotated) by the pointing device, the microcomputer updates the orientation angle and the residual error bar graphs. For example, in FIG. 5C, the shim display has been rotated to an orientation of 48°, with the bar graphs displaying the corresponding residual errors of 0.00° for camber and −0.23° for toe. Note that the scroll bar and the "Improve Camber" and "Improve Toe" legends on soft keys 5A and 5B vanish during this mode of operation. FIG. 5D illustrates the result of the same operation where the technician has rotated the displayed shim to 64°, at which point the residual camber error is 0.34°, but the residual toe error is zero. It should be understood that as the technician rotates the shim display, he or she observes the residual errors displayed on the bar graphs. This visual feedback allows the technician to interactively set the residual errors desired (within the possible range of errors achievable by the shim). In FIG. 5C, the residual camber error was interactively set to zero, while in FIG. 5D it was the residual toe error which was set to zero.

On occasion, the technician may not have or wish to use the size shim selected by microcomputer 6. If the system is equipped with a pointing device such as a light pen or mouse, the technician may change the shim size by the expedient of "clicking" the pointing device in the bottom half of the shim center representation for the next smaller size, and in the top half of the shim center representation for the next larger size. This can be repeated to cycle through the available shim sizes.

The result of this action in the bottom half of the shim representation of FIG. 5 is illustrated in FIG. 5E. The graphical display of the No. 6 shim of FIG. 5 is replaced by the No. 5 shim of FIG. 5E and the corresponding residual errors of 0.38° camber error and −0.26° toe error in displayed in the bar graphs. The technician can thus instantly determine the effect of using the manually selected size of shim on the residual camber and toe errors.

Figure 5F:
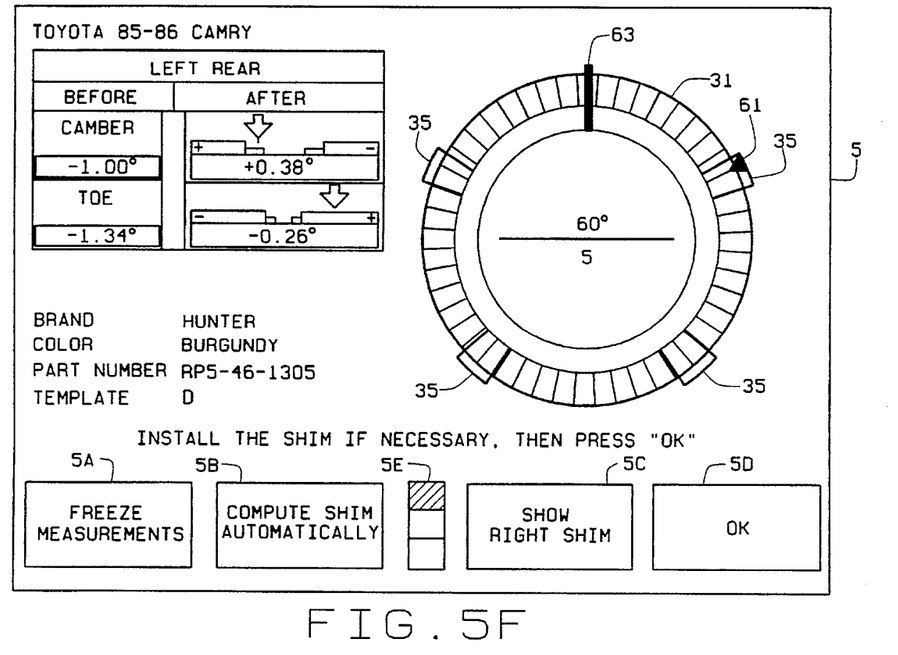

At any time during manual selection of shim orientation (by dragging shim 31 ) or during manual selection of a different sized shim (by clicking in the graphical shim representation), the technician can return to computer determination of the proper shim and shim orientation. This is illustrated in FIG. 5F. Soft key 5B (when the top segment of display 5E is active) has the legend "Compute Shim Automatically" displayed. The technician by actuating that soft key removes the manual override of shim selection and microcomputer 6 thereupon determines both the proper shim and shim orientation.

The above description has concerned primarily one-piece, non-adjustable shims. There are adjustable, two-piece shims available, such as the two piece shim 71 shown in FIG. 6, having two pieces which can be rotated, one relative to the other, to continuously vary the taper of the shim. The shim 71 includes a pair of ears 73, 75, each connected to a corresponding piece of the two-piece shim, to facilitate the relative rotation of the two parts of the shim. Ears 73, 75 also provide a ready reference for the relative positions of the two pieces of the shim 71. Once the two pieces of shim 71 are rotated to the relative position with respect to each other to give the correct taper, the entire shim is then rotated to the correct orientation angle and installed. Shims such as shim 71 normally provide "perfect" adjustments, provided that the changes required are not so large that the shim cannot provide enough change.

Figure 6:
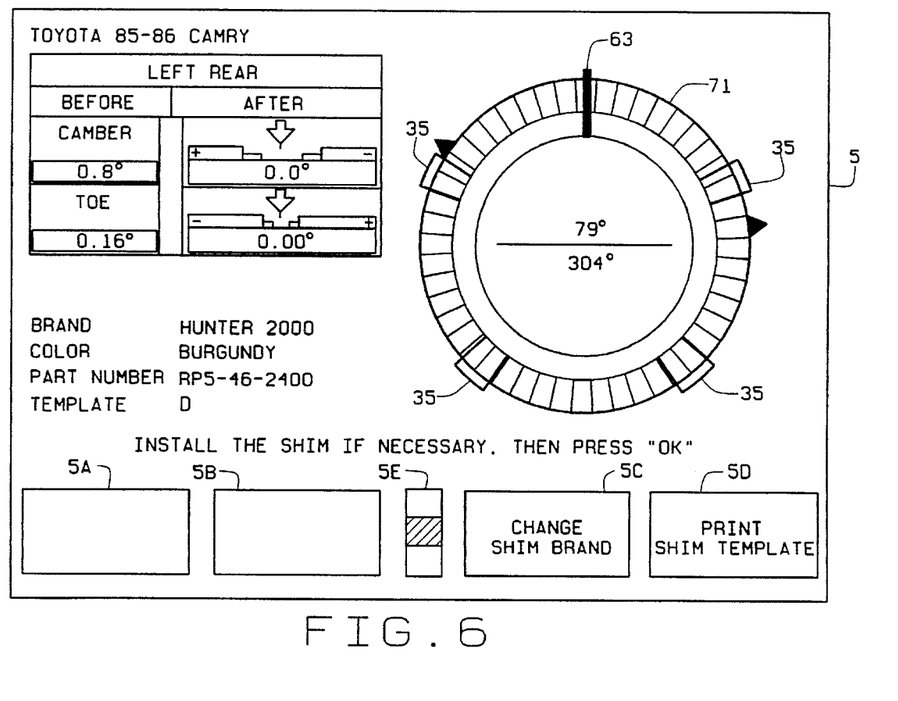
FIGS. 6–6A are illustrative screens used in the present invention in connection with adjustable shims to correct camber and toe.

Microcomputer 6 supports such two-piece shims. When such a shim is selected via the "Change Shim Brand" soft key, it displays for the technician the relative positions of the two parts of the shim 71, and the proper orientation. Note that in this case the legends "Improve Camber" and "Improve Toe" are not displayed, as they are not needed. The residual error for both camber and toe using this shim is always zero, unless the changes required are beyond the range of the shim. Similarly, the scroll bar is not shown for indicating how residual error is divided between toe and camber, since there is normally no residual error. In those cases where the changes required are beyond the range of the shim, the graphical representation of the shim shows it adjusted to its maximum taper and the microcomputer treats it as a non-adjustable shim. In that exceptional circumstance, the "Improve Camber" and "Improve Toe" legends reappear, as does the scroll bar.

Whether the shim type selected is adjustable or not, the graphical representation of the shim on screen 5 may be used as a template for the shim, showing its proper orientation. For this reason, the present invention includes provision for setting the display to show the selected shim actual or life-sized. Actual size displays are particularly useful in the case of adjustable shims since they allow the relative positions of the two pieces of the shim to be accurately set by placing the shim against the screen and rotating it until the two ears 73, 75 exactly match those shown on the screen.

Figure 6A:
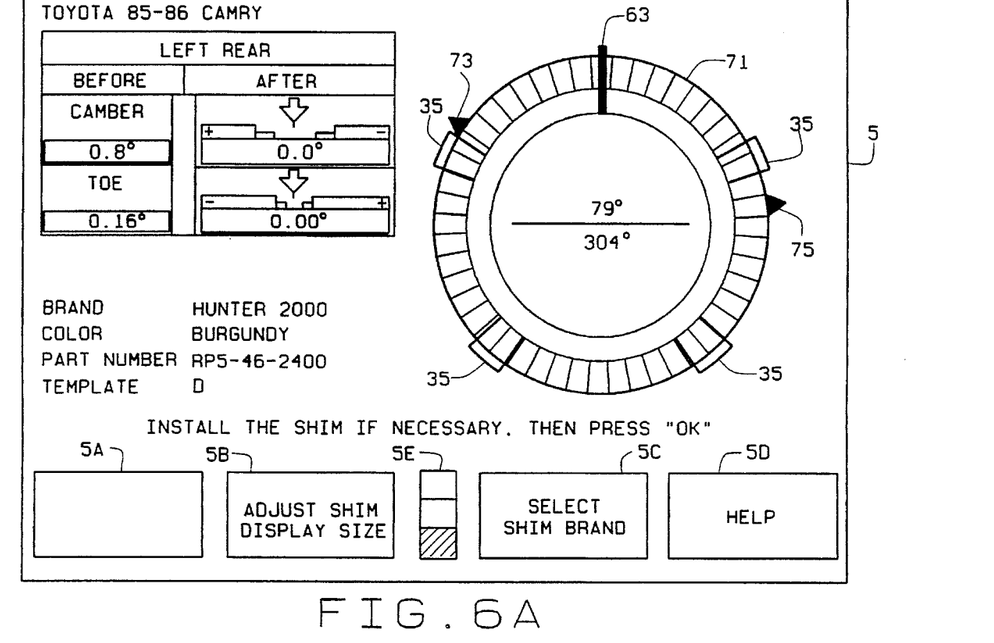
Figure 7:
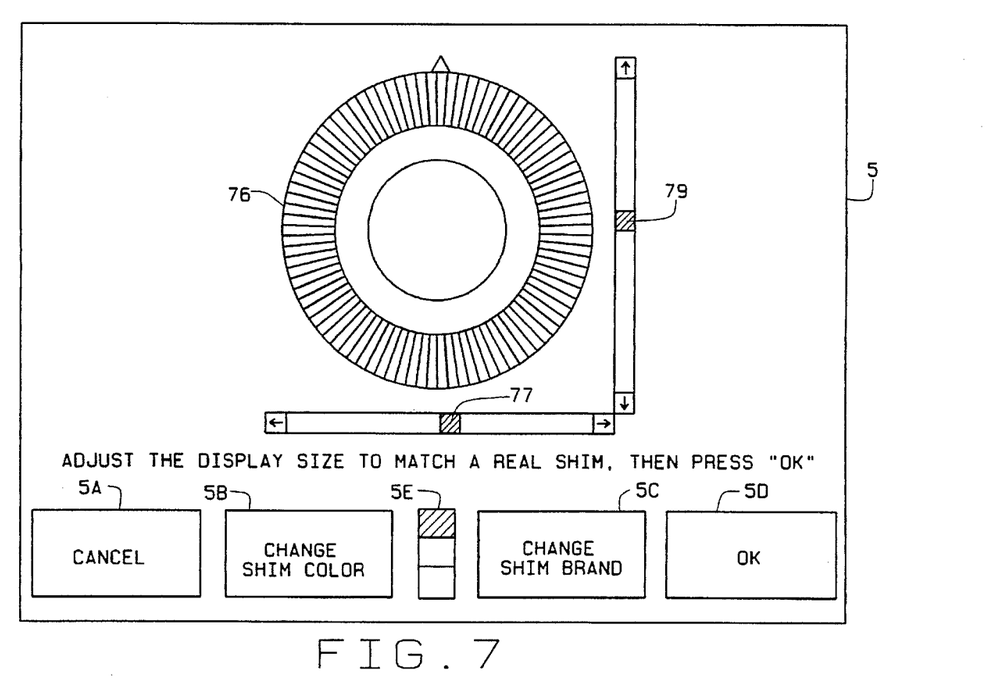
FIGS. 7–7C are illustrative screens used in the present invention to cause the display of shims on the screens to be actual or life-sized.
Figure 7A:
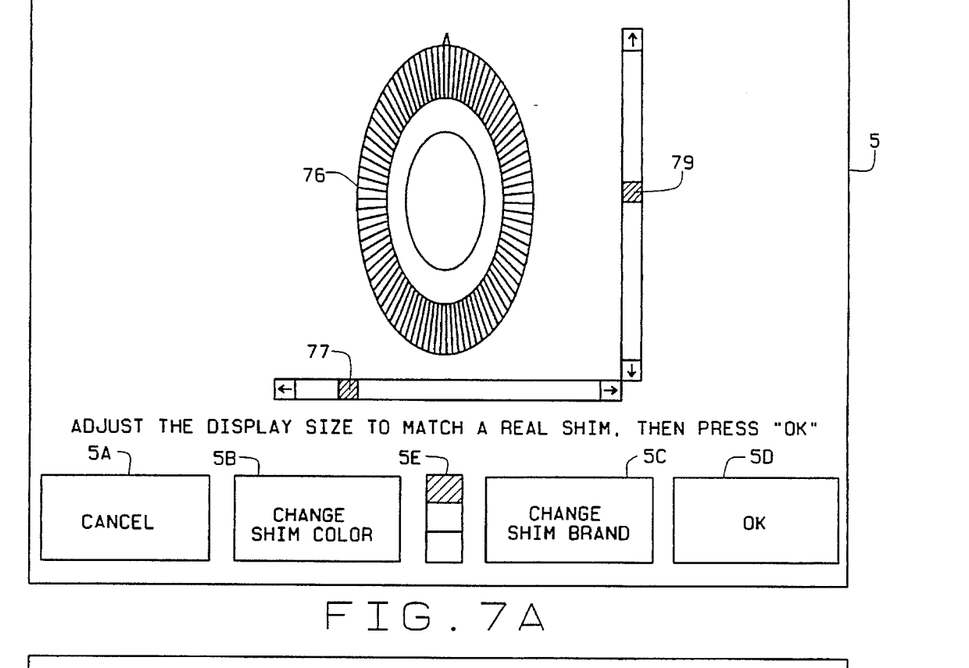
Figure 7B:
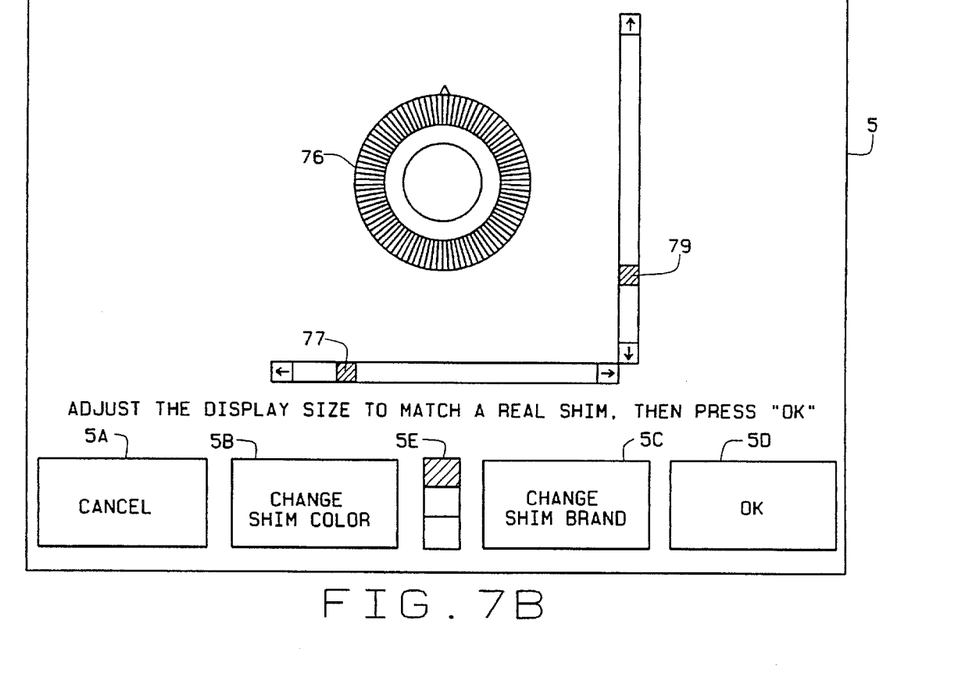
Figure 7C:
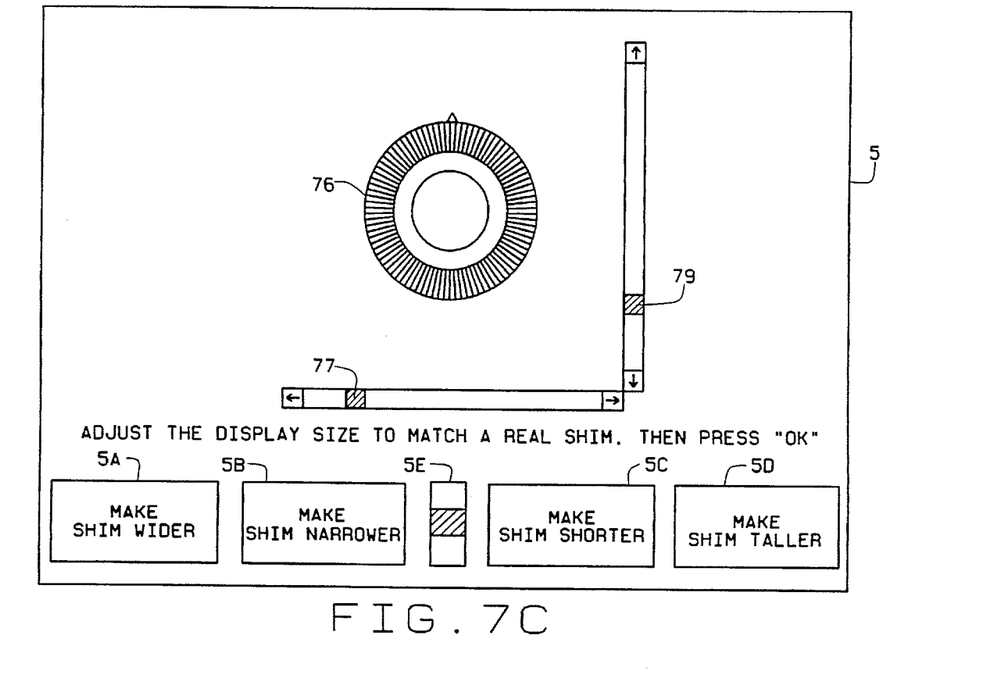

Changing the size of the display is illustrated in FIGS. 7–7C. The shim display size routine is entered by actuating soft key 5B when the lowest segment of display section 5E is active. The legend on soft key 5B at this time (see FIG. 6A) reads "Adjust Shim Display Size." Microcomputer 6 thereupon controls display 5 to display the screen shown in FIG. 7. The technician then actuates soft keys 5B ("Change Shim Color") and 5C ("Change Shim Brand") as appropriate until the particular shim in question is displayed as at 76. At that point, with a pointing device the technician may drag a pair of scroll bars 77, 79 until the width matches the width of the desired shim (illustrated in FIG. 7A) and the height matches the height of the desired shim (illustrated in FIG. 7B). Alternatively, as shown in FIG. 7C, the soft keys may be used for the same purpose when the second segment of display section 5E is active. During this mode, soft keys 5A–5D bear the legends "Make Shim Wider," "Make Shim Narrower," "Make Shim Shorter," and "Make Shim Taller," respectively. Once the displayed shim is exactly the same size as the actual shim, the user presses the "OK" key (FIG. 7) to accept the new size. Once the system is set to display any shim life-sized, it thereafter displays all other shims life-sized as well, unless reset.

In view of the above, it will be seen that the various objects and features of the present invention are achieved and other advantageous results obtained. The description and drawings of the present invention contained herein are illustrative only and are not to be taken in a limiting sense.

What is claimed is:

1. A shim adjustment facilitating system for wheel alignment apparatus comprising:

camber and toe sensing apparatus for sensing the camber and toe of a wheel on a vehicle to be aligned;

a memory for storing camber and toe specification for a plurality of vehicles;

a computer for comparing the sensed camber and toe with the corresponding specification of camber and toe for the wheel of the vehicle to be aligned, for selecting a shim from a plurality of standard shims and an orientation for said shim to attempt to correct both camber and toe in accordance with a preset priority, and for determining residual camber error and residual toe error which would result from installation of said shim at said orientation;

at least one manually operable input device operable by a user for selecting a different desired priority of residual camber error and residual toe error, the computer being responsive to the manually operable input device for selecting another orientation which attempts to correct both camber and toe in accordance with said different desired priority; and a display for visually displaying residual camber error and residual toe error, whereby the user can see the change in the residual errors resulting from the user's selection of a desired priority.

2. The shim adjustment system for wheel alignment apparatus as set forth in claim 1 wherein the manually operable input device is operable for selecting any one of a plurality of different priorities for residual camber error and residual toe error.

3. The shim adjustment system for wheel alignment apparatus as set forth in claim 2 wherein the computer is responsive to the selecting of a particular priority for residual camber error and residual toe error to cause the display of the residual camber error and residual toe error corresponding to the selected priority.

4. The shim adjustment system for wheel alignment apparatus as set forth in claim 3 further including a display for displaying the orientation of the selected shim resulting from the residual error priority selected by the user.

5. The shim adjustment system for wheel alignment apparatus as set forth in claim 1 further including a display for displaying the orientation of the selected shim corresponding to the residual error priority selected by the user.

6. The shim adjustment system for wheel alignment apparatus as set forth in claim 1 further including a display for displaying to the user a representation of the selected shim and the orientation of the selected shim.

7. The shim adjustment system for wheel alignment apparatus as set forth in claim 6 further including a manually operable device for requesting a change in the displayed orientation of the selected shim with respect to a reference.

8. The shim adjustment facilitating system for wheel alignment apparatus as set forth in claim 7 wherein the computer is responsive to a requested change in the displayed orientation of the selected shim to determine the residual camber error and the residual toe error resulting from installation of the selected shim in the changed orientation and to cause the display of said residual errors to the user.

9. A shim adjustment system for wheel alignment apparatus comprising:

camber and toe sensing apparatus for sensing the camber and toe of a wheel on a vehicle to be aligned;

a memory for storing camber and toe specifications for a plurality of vehicles;

a computer for comparing the sensed camber and toe with the corresponding specification of camber and toe for the wheel of the vehicle to be aligned, for selecting a shim from a plurality of standard shims and an orientation for said shim to attempt to correct both camber and toe, and for determining residual camber error and residual toe error which would result from installation on the vehicle of the selected shim at the selected orientation;

a display for displaying to a user a representation of the selected shim and selected shim orientation;

a manually operable input device operable by the user for selecting a desired change in the orientation of the selected shim, the computer being responsive to the selection of a desired change in said shim orientation to cause the display of a new representation to the user, said new representation depicting the residual camber error and residual toe error which would result from the use of the displayed shim at the desired orientation.

10. A shim adjustment facilitating system for wheel alignment apparatus comprising:

camber and toe sensing apparatus for sensing the camber and toe of a wheel on a vehicle to be aligned;

a memory for storing camber and toe specifications for a plurality of vehicles;

a computer for comparing the sensed camber and toe with the corresponding specifications of camber and toe for the wheel of the vehicle to be aligned, for selecting a shim from a plurality of standard shims and an orientation for said shim to attempt to correct both camber and toe, and for determining residual camber error and residual toe error which would result from installation on the vehicle of the selected shim at the selected orientation;

a display for displaying to a user the residual camber error and the residual toe error determined by the computer prior to installation of said shim at said orientation on said vehicle.

11. The shim adjustment system as set forth in claim 10 wherein the computer selects the shim and shim orientation in accordance with a preset allocation of residual toe and camber error, further including at least one manually operable input device operable by a user for selecting any of a plurality of different desired allocations of residual camber error and residual toe error, the computer being responsive to the selection of one of the plurality of different desired allocations of residual error for determining a shim orientation which attempts to correct both camber and toe accordance with the particular different desired allocation of residual errors requested.

12. The shim adjustment system for wheel alignment apparatus as set forth in claim 11 wherein the computer operates in substantially real time to determine the residual errors corresponding to the allocation of residual errors requested by the user, said corresponding residual errors being displayed on the display in substantially real time to enable the user to visually determine the effect on camber residual error and toe residual error of the particular error allocations requested.

13. The shim adjustment system for wheel alignment apparatus as set forth in claim 11 further including a display for displaying the orientation of the selected shim resulting from the residual error allocation selected by the user.

14. The shim adjustment system for wheel alignment apparatus as set forth in claim 13 wherein the display also displays to the user a graphical representation of the selected shim.

15. The shim adjustment system for wheel alignment apparatus as set forth in claim 14 further including a manually operable device for requesting a change in the displayed orientation of the selected shim with respect to a reference.

16. The shim adjustment system for wheel alignment apparatus as set forth in claim 15 wherein the computer is responsive to a requested change in the displayed orientation of the selected shim to determine the residual camber error and the residual toe error resulting from installation of the selected shim in the changed orientation and to cause the display of said residual errors to the user.

17. The shim adjustment system as set forth in claim 10 further including a manually operable input device operable by a user for selecting a particular shim from a plurality of standard shims, the computer being responsive to the selection of a particular shim by the user to determine the residual errors which would result from the installation of the particular shim selected by the user and to cause the display of said residual errors to the user.

18. The shim adjustment system as set forth in claim 10 wherein the display also displays the difference between the sensed camber and toe and the corresponding specifications of camber and toe.

19. A method of facilitating shim adjustment for wheel alignment apparatus comprising:

sensing the camber and toe of a wheel on a vehicle to be aligned;

comparing the sensed camber and toe with corresponding specifications of camber and toe for the wheel of the vehicle to be aligned;

based on the previous step, selecting a shim from a plurality of standard shims and an orientation for said shim to attempt to correct both camber and toe in accordance with a preset priority;

determining residual camber error and residual toe error which would result from installation of said shim at said orientation;

manually changing the priority of residual camber error and residual toe error and selecting another orientation for said shim which attempts to correct both camber and toe in accordance with the changed priority; and displaying the residual camber error and residual toe error corresponding to the manually selected priority.

20. The shim adjustment method as set forth in claim 19 wherein the any one of a plurality of different priorities for residual camber error and residual toe error may be manually selected.

21. The shim adjustment method as set forth in claim 19 further including a display for displaying the orientation of the selected shim resulting from the residual error priority selected by the user.

22. The shim adjustment method as set forth in claim 19 further including displaying to the user a graphical representation of the selected shim and the orientation of the selected shim.

23. The shim adjustment method as set forth in claim 22 further including manually requesting a change in the displayed orientation of the selected shim with respect to a reference, determining the residual camber error and the residual toe error which would result from installation of the selected shim in the changed orientation, and displaying said residual errors.

24. A method of facilitating shim adjustment using wheel alignment apparatus comprising:

sensing the camber and toe of a wheel on a vehicle to be aligned;

comparing the sensed camber and toe with corresponding specifications of camber and toe for the wheel of the vehicle to be aligned;

based on the previous step, selecting a shim from a plurality of standard shims and an orientation for said shim to attempt to correct both camber and toe;

determining residual camber error and residual toe error which would result from installation on the vehicle of the selected shim at the selected orientation;

displaying to a user a representation of the selected shim and selected shim orientation;

manually requesting a desired change in the orientation of the selected shim;

displaying to the user the residual camber error and residual toe error which would result from the use of the displayed shim at the desired changed orientation.

25. A shim adjustment method for wheel alignment apparatus comprising:

sensing the camber and toe of a wheel on a vehicle to be aligned;

comparing the sensed camber and toe with the corresponding specification of camber and toe for the wheel of the vehicle to be aligned;

based on the previous step, selecting a shim from a plurality of standard shims and an orientation for said shim to attempt to correct both camber and toe;

determining residual camber error and residual toe error which would result from installation on the vehicle of the selected shim at the selected orientation;

displaying to a user the determining residual camber error and the residual toe error prior to installation of said shim at said orientation on said vehicle; and installing the shim at said orientation on said vehicle.

26. The shim adjustment method as set forth in claim 25 wherein the shim and shim orientation are selected in accordance with a preset allocation of residual toe and camber error, further including the step of manually requesting any of a plurality of different desired allocations of residual camber error and residual toe error, and electronically selecting a shim orientation which attempts to correct both camber and toe in accordance with the particular different desired allocation of residual errors requested.

27. The shim adjustment method as set forth in claim 26 wherein the residual errors corresponding to the allocation of residual errors requested are displayed in substantially real time to enable the user to visually determine the effect on camber residual error and toe residual error of the particular error allocations requested.

28. The shim adjustment method as set forth in claim 25 further including manually selecting a particular shim from a plurality of standard shims, electronically determining the residual errors which would result from the installation of the particular shim selected, and displaying said residual errors.

* * * * *